United States Patent
Filipe et al.

(10) Patent No.: US 8,722,805 B2
(45) Date of Patent: May 13, 2014

(54) HIGH FLOWABILITY LONG CHAIN BRANCHED POLYPROPYLENE

(75) Inventors: Susana Filipe, Leonding (AT); Katja Klimke, Linz (AT); Anh Tuan Tran, Langenstein (AT); Petar Doshev, Linz (AT); Antti Tynys, Linz (AT); Martin Obadal, Linz (AT); Cornelia Kock, Pucking (AT); David Friel, Copenhagen V (DK)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/696,909

(22) PCT Filed: Nov. 29, 2010

(86) PCT No.: PCT/EP2010/007227
§ 371 (c)(1),
(2), (4) Date: Jan. 29, 2013

(87) PCT Pub. No.: WO2011/141044
PCT Pub. Date: Nov. 17, 2011

(65) Prior Publication Data
US 2013/0123431 A1 May 16, 2013

(30) Foreign Application Priority Data
May 11, 2010 (EP) .................................... 10004991

(51) Int. Cl.
*C08F 8/00* (2006.01)
*C08L 23/04* (2006.01)

(52) U.S. Cl.
USPC .......................................... 525/191; 525/240

(58) Field of Classification Search
USPC ............................................... 525/191, 240
See application file for complete search history.

(56) References Cited

U.S. PATENT DOCUMENTS

| 6,620,891 B2 * | 9/2003 | Yu et al. ........................ 525/240 |
| 8,541,507 B2 * | 9/2013 | Doshev et al. ................ 525/191 |
| 2003/0195300 A1 | 10/2003 | Stevens et al. |

FOREIGN PATENT DOCUMENTS

| EP | 0 887 379 | 12/1998 |
| EP | 1 382 638 | 1/2004 |
| EP | 1 741 725 | 1/2007 |
| EP | 2 113 541 | 11/2009 |
| EP | 2 316 882 | 5/2011 |
| WO | WO 92/12182 | 7/1992 |
| WO | WO 92/19653 | 11/1992 |
| WO | WO 2008/074715 | 6/2008 |
| WO | WO 2010/049371 | 5/2010 |

OTHER PUBLICATIONS

International Search Report mailed Feb. 10, 2011 for International application No. PCT/EP2010/007227.
Baumgaertel et al., *Determination of discrete relaxation and retardation time spectra from dynamic mechanical data*, Rheologica Acta 28:511-519, 1989.
International Preliminary Report on Patentability and Written Opinion issued Nov. 13, 2012 for International application No. PCT/EP2010/007227.

* cited by examiner

*Primary Examiner* — Nathan M Nutter
(74) *Attorney, Agent, or Firm* — Fay Sharpe LLP

(57) ABSTRACT

The present invention relates to a polypropylene composition showing a high melt flow rate and high melt strength while maintaining high impact strength. The composition of the present invention is obtainable by using a low molecular weight linear isotactic polypropylene as melt flow enhancer for a high molecular weight polypropylene having a high melt strength and impact strength. The inventive composition could be used for the production of different articles.

14 Claims, No Drawings

HIGH FLOWABILITY LONG CHAIN BRANCHED POLYPROPYLENE

The present invention relates to a polypropylene composition showing a high melt flow rate and high melt strength while maintaining high impact strength. The composition of the present invention is obtained by using a low molecular weight linear isotactic polypropylene as melt enhancer for a high molecular weight polypropylene. The composition of the present invention could be used for the production of different articles.

In the field of molded articles it is of great importance to have a well flowing material with good mechanical properties, i.e. a high tensile modulus and acceptable impact strength. The good flowability is needed for achieving a good processability in various manufacturing methods of articles, e.g. extrusion and molding processes, thereby allowing the high production speed required in this mass production market.

It is generally known that polyolefins produced by low pressure processes are generally linear materials which are characterized by none or very moderate melt strength and strain hardening behaviour. In order to improve their suitability for applications like e.g. foaming, fibre production, different approaches were undertaken to give rise to long chain branching and ultimately to higher melt strength. The long chain branching can be initiated by post reactor treatment (peroxide, irradiation). In case of post reactor peroxide treatment, an external polyfunctional component (e.g. 1,3-Bis (citraconimidomethyl)benzene, low molecular weight polybutadiene) should be utilized as a chain extender. This approach is used for production of high melt strength polypropylene (HMS-PP). Besides improved melt strength, the presence of long chain branches imposes very good impact strength, which could be interesting for dapplications like injection molding. However, these applications usually require higher melt flow rates of the used composition.

The post reactor modification approach has inherent limitations concerning the maximum achievable melt flow rate, because of the competition chain scission and chain build-up. A conventional vis-breaking is also not possible since it will result in scission of the side chains and consequentially decrease of the impact strength.

EP1382638 claims a polypropylene composition of a propylene homopolymer or propylene random copolymer with up to 50 wt-% high melt strength and a β-nucleating agent. The resulting blend shows a good stiffness to impact balance and can be used for housing and household applications. However, the predominant β-modification causes a reduced melting temperature and thermo-mechanical stability.

WO2008/074715 A1 refers to a filled polypropylene-composition consisting of 15-55% by weight of a polymer component, 20-80% filler (inorganic) and 4-25% elastomeric polymer or polymer composition. The filler content however causes a density increase and surface quality reduction unwanted in many applications.

Thus, even though the described compositions showing good processability and mechanical properties, there is still a need of compositions having a high melt flow rate, and thus, excellent processability properties while maintaining their good mechanical properties, i.e., there is a need for high melt flow rate, high impact, long chain branched materials.

Therefore, object of the present invention is to provide a polypropylene composition with high flowability, i.e. good processability, which at the same time has high melt strength and good mechanical properties; in particular the composition shows an improved balance of impact strength and processability properties.

It has surprisingly been found that the above object can be achieved if a high melt strength polypropylene polymer showing good strain hardening behaviour is blended with a low molecular weight linear isotactic polypropylene having a high melt flow rate. This in particular arises from the mutual co-crystallization of both well miscible stereoregular components.

Therefore, the present invention provides a polypropylene composition comprising (A) 70 to 95 wt %, based on the total weight of the polypropylene composition, of a high molecular weight polypropylene component having a strain hardening factor (SHF) in a range of 3.5 to 15 when measured at a strain rate of $3.0\ s^{-1}$ and a Hencky strain of 2.5, and (B) 5 wt % to 30 wt %, based on the total weight of the polypropylene composition, of a low molecular weight linear isotactic polypropylene component having a $MFR_2$ in a range of 500 to 5000 g/10 min measured according to ISO 1133 (230° C., 2.16 kg load).

The inventive composition is obtainable by blending both components as described above, i.e. component (A) with component (B), wherein the use of the low molecular weight linear isotactic polypropylene (B) as melt flow enhancer in that specific amount yields a melt flow increase of at least three orders of magnitude while maintaining high melt strength and keeping the impact strength of the composition.

The high molecular weight polypropylene component (A) is a high melt strength polypropylene due to the presence of long chain branches in the polymer.

Polymers having long chain branches show a lower gyration radius in solution then the respective linear species with identical molecular weight. The theoretical branching index $g_{th}$ is then $$g_{th} = \frac{<s^2>_{bra}}{<s^2>_{lin}}$$

where $$<S^2> = \frac{1}{2N^2}\sum_{i=1}^{N}\sum_{j=1}^{N}\overline{r_{ij}^2}$$

where $<s^2>$ is the gyration radius resulting from the summation of the end-to-end distance of the polymer molecules. Due to proportionality between the gyration radius and the intrinsic viscosity, the branching index g' can simply be calculated $$g' = \left(\frac{[\eta]_{bra}}{[\eta]_{lin}}\right)_M = g_t^\varepsilon$$

the $[\eta]_{lin}$ value for linear polymer is calculated from SEC measurement with a usual relation and the $[\eta]_{bra}$ for the branched polymer is measured directly in solution.

The exponent ε is between 0.5 and 1 generally. Like $g_{th}$, g' is always less than 1 for long chain branched polymers, a lower value reflects a higher degree of branching. Details of the calculation and the relation to the chain structure can for example be found in a paper by B. M. Zimm and W. M. Stockmayer (J. Chemical Physics 17 (1949) 1301-1310).

The intrinsic viscosity needed for determining the branching index g' is measured according to DIN ISO 1628/1, October 1999 (in decalin at 135° C.).

It is preferred that the high molecular weight component (A) used in the inventive polypropylene composition has a branching index of g' less than 1, more preferred of less than 0.9, most preferred of less than 0.7. In a preferred embodiment the high molecular weight component (A) has a branching index of 0.6 to 0.9.

It is also preferred that the high molecular weight polypropylene component (A) has a LAOS non-linearity factor (LAOS-NLF) in a range of 4.0 to 10, preferably in a range of 4.5 to 9.

The large amplitude oscillatory shear (LAOS) measurement method is a very sensitive and at the same time simple characterization method being commonly used in the scientific literature. In this method a single excitation frequency is applied and the torque response is analysed. The non-linear response generates mechanical higher harmonics at (3, 5, 7, . . . ). Fourier Transform analysis allows recovery of intensities and phases. As the intensity of the higher harmonics decreases rapidly, which can lead to very low values of the $5^{th}$ and higher harmonics, the ratio of the $$LAOS-NLF = \left|\frac{G'_1}{G'_3}\right|$$

provides the most reliable characterization of the polymer structure.

LAOS-NLF of higher than 2.5 indicates a high degree of long chain branching.

Furthermore, the high molecular weight polypropylene component (A) and the polypropylene composition according to the present invention show good strain hardening behaviour.

The high molecular weight polypropylene component (A) has a strain hardening factor (SHF) in a range of 3.5 to 15, preferably in a range of 4.5 to 12.5, more preferably in a range of 5.0 to 10 when measured at a strain rate of 3.0 s$^{-1}$ and a Hencky strain of 2.5.

In addition, the high molecular weight polypropylene component (A) has preferably a strain rate hardening factor (SHF) in a range of 2.4 to 8.0, more preferably in a range of 2.8 to 7.5, even more preferably in a range of 3.0 to 7.0 when measured at a strain rate of 1.0 s$^{-1}$ and a Hencky strain of 2.0.

The strain hardening factor is defined as $$SHF = \frac{\eta_E^+(t,\dot{\varepsilon})}{\eta_{LVE}^+(t)} = \frac{\eta_E^+(t,\dot{\varepsilon})}{3\eta^+(t)}$$

wherein
$\eta_E^+(t,\dot{\varepsilon})$ is the uniaxial extensional viscosity; and
$\eta_{LVE}^+(t)$ is three times the time dependent shear viscosity $\eta^+(t)$ in the linear range of deformation.

The determination of the linear viscoelastic envelop in extension $\eta_{LVE}^+(t)$, using IRIS Rheo Hub 2008, requires the calculation of the discrete relaxation time spectrum from the storage and loss modulus data (G', G" ($\omega$)). The linear viscoelastic data (G', G" ($\omega$)) is obtained by frequency sweep measurements. The underlying calculation principles used for the determination of the discrete relaxation spectrum are described in Baumgärtel M, Winter H H, "Determination of the discrete relaxation and retardation time spectra from dynamic mechanical data", Rheol Acta 28:511519 (1989) which is incorporated by reference.

IRIS RheoHub 2008 expresses the relaxation time spectrum as a sum of N Maxwell modes $$\overset{o}{G}(t) = G_e \cdot \sum_{1}^{N} g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, is done by using the option "optimum" from IRIS RheoHub 2008. The equilibrium modulus $G_e$ is set at zero. The non-linear fitting used to obtain $\eta_{LVE}^+(t)$ is performed on IRIS Rheo Hub 2008, using the Doi-Edwards model.

It is further preferred that the high molecular weight polypropylene component (A) has a F30 melt strength in a range of 6.0 to 30 cN, preferably in a range of 8.0 to 29.5 cN at 200° C. determined in the Rheotens test as described in the experimental part.

The inventive composition comprises the high molecular weight polypropylene component (A) in an amount of 70 to 95 wt %, preferably in an amount of 73 to 92 wt %, most preferably in an amount of 80 to 90 wt %, based on the total amount of the composition.

Moreover, it is preferred that the high molecular weight polypropylene component (A) has an MFR$_2$ of 0.5 to 5.0 g/10 min, more preferred of 1.0 to 4.5 g/10 min, most preferred of 1.5 to 4.0 g/10 min, measured according to ISO 1133 (230° C., 2.16 kg load).

The high molecular weight polypropylene component (A) may be a homo- or copolymer component. In case that the high molecular weight polypropylene component (A) is a copolymer it will typically contain ethylene and/or C$_4$-C$_{12}$ alpha-olefin(s) in an amount of 0.5 to 10 wt %.

However, it is preferred that the component (A) is a polypropylene homopolymer component.

According to the present invention the low molecular weight linear isotactic polypropylene component (B) is preferably used in the composition in an amount of 8 to 27 wt %, more preferably in an amount of 10 to 20 wt %, based on the total weight of the polypropylene composition.

Furthermore, the low molecular weight linear isotactic polypropylene component (B) has a MFR$_2$ of 500 g/10 min to 5000 g/10 min, preferably of 600 to 3000 g/10 min, more preferably of 700 to 2500 g/10 min, measured according to ISO 1133 (230° C., 2.16 kg load).

As explained above, the use of the low molecular weight linear isotactic polypropylene component (B) as melt flow enhancer in the inventive composition yields a melt flow increase of at least three orders of magnitude while maintaining high melt strength and keeping the impact strength of the composition.

Thus, the polypropylene composition according to the present invention has preferably a MFR$_2$ of 5.0 to 30 g/10 min, more preferably of 5.5 to 25 g/10 min, most preferably of 6.0 to 20 g/10 min, measured according to ISO 1133 (230° C., 2.16 kg load).

Furthermore, the low molecular weight linear isotactic polypropylene component (B) has preferably a xylene soluble content (XSC) measured as described in the experimental part of 0.1 to 15 wt %, more preferably of 0.5 to 10 wt %, most preferably between 0.8 to 8.0 wt % based on the total amount of component (B).

The polypropylene composition according to the present invention comprises the high molecular weight component (A) and the low molecular weight component (B). The terms "high" and "low" do not define absolute values but denote the relationship between the two components as regards their molecular weight. Each of the two components has its own molecular weight distribution.

The molecular weight distribution MWD is defined as the ratio between the weight average molecular weight Mw and the number average molecular weight Mn. The MWD is measured by GPC.

The strain hardening factor (SHF) of the inventive composition is preferably in a range of 2.0 to 9.0 more preferably of 2.3 to 8.0 measured at a strain rate of $3.0 \, s^{-1}$ and a Hencky strain of 2.5, and preferably in a range of 1.3 to 5.0, more preferably of 1.5 to 4.5 measured at a strain rate of $1.0 \, s^{-1}$ and Hencky strain 2.0.

It is also preferred that the inventive composition has a LAOS non-linearity factor (LAOS-NLF) in a range of 2.5 to 8.0, more preferred in a range of 3.0 to 7.0 measured according to the LAOS method as described in the experimental part.

Moreover, it is preferred that the inventive composition has a F30 melt strength in a range of 4.0 to 30 cN, more preferred in a range of 5.0 to 25 cN at 200° C. determined in the Rheotens test as described in the experimental part.

Furthermore, the inventive composition has preferably a Charpy notched impact strength of 3.5 to 10 $kJ/m^2$, more preferably of 3.8 to 8.5 $kJ/m^2$, most preferably of 4.0 to 7.5 $kJ/m^2$ at 23° C. measured according to ISO 179:2000 1eA.

In addition the polypropylene composition of the present invention has preferably a tensile modulus in a range of 1600 to 4000 MPa, more preferably in a range of 1700 to 3500 MPa, most preferably in a range of 1800 to 2000 MPa, measured according to ISO 572-2.

It is also preferred that the inventive composition has a crystallization temperature in a range of 120 to 145° C., more preferred in a range of 125 to 140° C., determined according to ISO 11357-1, -2 and -3.

Furthermore, the polypropylene composition has preferably a melting temperature in a range of 150 to 175° C., more preferably in a range of 158 to 170° C., determined according to ISO 11357-1, -2 and -3.

The polypropylene composition according to the present invention may comprise further polyolefin components and may also contain non-polymeric additives.

The polymeric part of the polypropylene composition is denoted as base resin.

Preferably, the base resin consists of components (A) and (B) as described above.

It is also preferred that both component (A) and component (B) are stabilized by suitable additives which are preferably used in an amount of 0.05 to 2.0 wt %, more preferably in an amount of 0.1 to 1.0 wt % based on the amount of each component.

Owing to the high difference in molecular weight of components (A) and (B) the base resin of the polypropylene composition has a multimodal, preferably a bimodal molecular weight distribution.

The expression "multimodal" used herein refers to the modality of the polymer, i.e. the form of its molecular weight distribution curve, which is the graph of the molecular weight component as a function of its molecular weight. As will be explained below, the base resin of the present invention can be produced in a sequential step process, using reactors in serial configuration and operating at different reaction conditions. As a consequence, each component prepared in a specific reactor will have its own molecular weight distribution. When the molecular weight distribution curves from these components are superimposed to obtain the molecular weight distribution curve of the final polymer, that curve may show two or more maxima or at least be distinctly broadened when compared with curves for the individual components. Such a polymer, produced in two or more serial steps, is called bimodal or multimodal, depending on the number of steps.

The base resin of the polypropylene composition according to the present invention may be a multimodal, preferably a bimodal composition.

The two components (A) and (B) and optionally further components may be produced in separate steps and mixed after polymerization by compounding.

Alternatively and preferably, the two components (A) and (B) and optionally further components are produced in a different reactor each, which reactors are connected in series, and each component is produced in the presence of the product of the preceding reactor(s) except for the first component.

The described preferred multistage process is a "loop-gas phase"-process, such as developed by Borealis A/S, Denmark (known as BORSTAR® technology) described e.g. in patent literature, such as in EP 0 887 379 or in WO 92/12182. Optionally, the process may also comprise a pre-polymerization step in a manner known in the field and which may precede the first polymerization step (a).

It is preferred that the polymerization catalyst is a Ziegler-Natta catalyst as described e.g. in WO 92/19653 or a single site catalyst as described in e.g. EP 09013647 or EP 1741725 A1.

As already indicated above, the polypropylene composition may comprise conventional adjuvants, such as additives, fillers and reinforcing agents or additional impact modifiers.

These modifiers and/or additives may be included during the polymerization process or after the polymerization by melt mixing. Suitable modifiers include other thermoplastics like polyethylene homo- or copolymers, poly-1-butene, poly-4-methylpentene-1 and/or thermoplastic elastomers like ethylene-propylene rubber or styrene elastomers as well as mineral fillers like talc or calcium carbonate. Suitable additives include stabilizers, lubricants, nucleating agents, pigments and foaming agents. Such additives will normally be present in the final composition in an amount of 0.05 to 2.0 wt %, preferably 0.1 to 1.0 wt %, based on the total amount of the composition.

The compositions of the current invention are preferably used for the production of molded articles, preferably injection molded articles.

EXPERIMENTAL PART

Measurement Methods a) Melt Flow Rate

The melt flow rate is measured as the MFR2 in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

b) Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N = k_1(A/R) + k_2$$

wherein A is the maximum absorbance defined of the comonomer band, R the maximum absorbance defined as peak height of the reference peak and with $k_1$ and $k_2$ the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

c) Xylene Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%−XCS %.

d) Branching Index

The branching index indicates the amount of long chain branches per 1000 carbon atoms. Both parameters can be determined from a combination of high temperature size exclusion chromatography (SEC) with viscosimetry. The underlying SEC investigations are carried out at 135° C. in 1,2,4-trichlorobenzene with solutions of 0.25 g/dl concentration. The molecular weight distributions are calculated from the results of a refractometric detector using the universal calibration method fitted for polypropylene. Parallel to that, the intrinsic viscosity of the complete polymer is determined at 135° C. in 1,2,4-trichlorobenzene with solutions of 0.05 g/dl concentration.

e) Strain Hardening Factor (SHF)

The strain hardening factor is defined as $$SHF = \frac{\eta_E^+(t,\dot{\varepsilon})}{\eta_{LVE}^+(t)} = \frac{\eta_E^+(t,\dot{\varepsilon})}{3\eta^+(t)}$$

wherein
$\eta_E^+(t,\dot{\varepsilon})$ is the uniaxial extensional viscosity; and $\eta_{LVE}^+(t)$ is three times the time dependent shear viscosity $\eta^+(t)$ in the linear range of deformation.

The determination of the linear viscoelastic envelop in extension $\eta_{LVE}^+(t)$, using IRIS Rheo Hub 2008, required the calculation of the discrete relaxation time spectrum from the storage and loss modulus data (G', G" (ω)). The linear viscoelastic data (G', G" (ω)) is obtained by frequency sweep measurements undertaken at 180° C., on a Anton Paar MCR 300 coupled with 25 mm parallel plates. The underlying calculation principles used for the determination of the discrete relaxation spectrum are described in Baumgärtel M, Winter H H, "Determination of the discrete relaxation and retardation time spectra from dynamic mechanical data", Rheol Acta 28:511519 (1989) which is incorporated by reference in its entirety.

IRIS RheoHub 2008 expresses the relaxation time spectrum as a sum of N Maxwell modes $$\overset{o}{G}(t) = G_e \cdot \sum_1^N g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, is done by using the option "optimum" from IRIS RheoHub 2008. The equilibrium modulus $G_e$ was set at zero.

The non-linear fitting used to obtain $\eta_{LVE}^+(t)$ is performed on IRIS Rheo Hub 2008, using the Doi-Edwards model.

The uniaxial extensional viscosity $\eta_E^+(t,\dot{\varepsilon})$ is obtained from uniaxial extensional flow measurements, conducted on an Anton Paar MCR 501 coupled with the Sentmanat extensional fixture (SER-1). The temperature for the uniaxial extensional flow measurements was set at 180° C., applying extension (strain) rates $\partial\varepsilon/\partial t$ ranging from 0.3 s$^{-1}$ to 10 s$^{-1}$ and covering a range of Hencky strain $$\varepsilon = (l-l_0)/l_0,$$

with $l_0$ being the original and l the actual sample fixation length, from 0.3 to 3.0. Particularly care was taken for the preparation of the samples for extensional flow. The samples were prepared by compression moulding at 230° C. followed by slow cooling to room temperature (forced water or air cooling were not used). This procedure allowed obtaining well shaped samples free of residual stresses. The sample was left for five minutes at the testing temperature to ensure thermal stability (set temperature±0.1° C.), before carrying out the uniaxial extensional flow measurements.

f) LAOS Non-Linear Viscoelastic Ratio

The investigation of the non-linear viscoelastic behavior under shear flow was done resorting to Large Amplitude Oscillatory Shear. The method requires the application of a sinusoidal strain amplitude, $\gamma_0$, imposed at a given angular frequency, ω, for a given time, t. Provided that the applied sinusoidal strain is high enough, a non-linear response is generated. The stress, σ is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [1-4] can be expressed by a Fourier series, which includes the higher harmonics contributions:

$$\sigma(t,\omega,\gamma_0) = \gamma_0 \cdot \Sigma_n [G'_n(\omega,\gamma_0) \cdot \sin(n\omega t) + G''_n(\omega,\gamma_0) \cdot \cos(n\omega t)]$$

with,
σ—stress response
t—time
ω—frequency
$\gamma_0$—strain amplitude
n—harmonic number
$G'_n$—n order elastic Fourier coefficient
$G''_n$—n order viscous Fourier coefficient The non-linear viscoelastic response was analyzed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied. The LAOS test is done applying a temperature of 190° C., an angular frequency of 0.628 rad/s and a strain amplitude of 10. In order to ensure that steady state conditions are reached, the non-linear response is only determined after at least 20 cycles per measurement are completed. The Large Amplitude Oscillatory Shear Non-Linear Factor (LAOS-NLF) is defined by:

$$LAOS-NLF = \left|\frac{G'_1}{G'_3}\right|$$

where $G'_1$—first order Fourier Coefficient
$G'_3$—third order Fourier Coefficient 1. J. M. Dealy, K. F. Wissbrun, *Melt Rheology and Its Role in Plastics Processing: Theory and Applications*; edited by Van Nostrand Reinhold, New York (1990)
2. S. Filipe, Non-Linear Rheology of Polymer Melts, *AIP Conference Proceedings* 1152, pp. 168-174 (2009)
3. M. Wilhelm, *Macromol. Mat. Eng.* 287, 83-105 (2002)
4. S. Filipe, K. Hofstadler, K. Klimke, A. T. Tran, Non-Linear Rheological Parameters for Characterisation of Molecular Structural Properties in Polyolefins, Proceedings of *Annual European Rheology Conference,* 135 (2010)

g) Rheotens Test

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr. 2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the melt strength and drawability values.

h) Melting Temperature, Crystallization Temperature

The melting and crystallisation temperature $T_m$ and $T_c$ are determined according to ISO 11357-3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature $T_c$ being determined in the cooling step and the $T_m$ melting temperature being determined in the second heating step.

i) Charpy Notched Impact Strength

Charpy impact strength was determined according to ISO 179-1eA:2000 on V-notched samples of 80×10×4 mm³ at 23° C. (Charpy NIS +23° C.) and a standard impact velocity of 2.9 m/s. The test specimens were prepared by injection moulding in line with ISO 1872-2, using a melt temperature of 200° C. and a mold temperature of 40° C.

j) Tensile Test, Yield Stress and Tensile Modulus

The tensile stress at yield is measured according to ISO 572-2 (cross head speed 50 mm/min, at 23° C.). The tensile modulus is measured according to ISO 572-2 (cross head speed 1 mm/min at 23° C.) using injection molded specimens as described in EN ISO 1872-2 (dog bone shape, 4 mm thickness).

k) Density

Density of the polymer was measured according to ISO 1183/D.

EXAMPLES

The polypropylene compositions according to the present invention have been produced by melt blending both polypropylene components (A) and (B).

The low molecular weight component (B) has been produced by using a single site catalyst (SSC) or a Ziegler-Natta catalyst (ZNC) as polymerization catalyst, while for the high molecular weight component (A) a commercial high melt strength polypropylene grade Deploy WB135HMS has been used.

a) Component (A)

Deploy WB135HMS is a commercial high melt strength polypropylene homopolymer available from Borealis Polyolefine GmbH (Austria), having an MFR (230° C./2.16 kg) of 2.4 g/10 min and a density of 905 kg/m³. It has a long-chain branched structure with a g'-value of 0.8, a melt strength F30 of 28.6 cN as determined in the Rheotens test at 200° C., a SHF of 6.5 when measured at a strain rate of 3.0 s⁻¹ and a Hencky strain of 2.5, a SHF of 3.6 when measured at a strain rate of 1.0 s⁻¹ and a Hencky strain of 2.0, and a LAOS-NLF of 4.93.

b) Component (B)

VPPP SSC

The experimental propylene homopolymer VPPP SSC has been produced in a Borstar PP pilot plant as follows:

The catalyst as described in example 1 of EP 1741725 A1 was fed together with triethylaluminium as cocatalyst with a Al/Zr ratio [mol/mol] of 910 into a stirred tank prepolymerization reactor together with propylene and hydrogen in a ratio of 0.2 mol/kmol propylene, the reactor being operated at 35° C. with an average residence time of 0.4 hours.

The main polymerization step was carried out in a loop reactor at a temperature of 70° C. and a pressure of 6000 kPa feeding additional propylene at 150 kg/h with hydrogen in a ratio of 0.70 mol/kmol propylene, maintaining an average residence time of 0.65 hours, and achieving a catalyst productivity of 17.5 kg/g.

After deactivation of the catalyst with steam and drying of the resulting polymer powder with warm nitrogen, the resulting polypropylene homopolymer was compounded together with 0.07 wt % Calcium Stearate and 0.60% Irganox B225

(antioxidant combination supplied by Ciba Specialty Chemicals) in a twin screw extruder at 230 to 250° C.

The resulting propylene homopolymer has an MFR (230° C./2.16 kg) of 710 g/10 min, a density of 902 kg/m$^3$, a melting point of 152° C. and an XS content of 1.0 wt.-%.

VPPP ZNC

The experimental propylene homopolymer VPPP ZNC has been produced in a Borstar PP pilot plant as follows:

The catalyst used in the polymerization was prepared according to WO 92/19653 with dioctylphthalate as dialkylphthalate of the formula (III) and ethanol as alcohol, the cocatalyst was triethylaluminium and as an external donor (ED) diethylaminotriethoxysilane was used.

The catalyst combination having an AL/Ti ratio of 45 mol/mol and an Al/ED ratio of 30 mol/mol was fed at a rate of 8.3 g/h into a stirred tank prepolymerization reactor together with propylene and hydrogen in a ratio of 0.4 mol/kmol propylene, the reactor being operated at 30° C. with an average residence time of 0.37 hours.

The first part of the main polymerization step was carried out in a loop reactor at a temperature of 75° C. and a pressure of 5600 kPa feeding additional propylene at 150 kg/h with hydrogen in a ratio of 30 mol/kmol propylene, and maintaining an average residence time of 0.33 hours.

This was followed by the second part of the main polymerization in a gas phase reactor at a temperature of 90° C. and a pressure of 1900 kPa, feeding additional propylene at 30 kg/h with hydrogen in a ratio of 160 mol/kmol propylene, and maintaining an average residence time of 0.7 hours. An overall catalyst productivity of 4.0 kg/g was achieved.

After deactivation of the catalyst with steam and drying of the resulting polymer powder with warm nitrogen, the resulting polypropylene homopolymer was compounded together with 0.07 wt % Calcium Stearate and 0.60% Irganox B225 (antioxidant combination supplied by Ciba Specialty Chemicals) in a twin screw extruder at 230 to 250° C.

The resulting propylene homopolymer has an MFR (230° C./2.16 kg) of 2300 g/10 min, a density of 904 kg/m$^3$, a melting point of 158° C. and an XS content of 7.2 wt.-%.

c) Composition

The inventive compositions are produced by melt blending WB135HMS as component (A) with VPPP SSC or VPPP ZNC as component (B). Comparative example CE1 relates to a composition including component (A) alone.

Table 1 lists the compositions of the examples and their respective MFR values (230° C./2.16 kg).

TABLE 1

Composition and MFR values of comparative example CE1 and inventive examples IE1 to IE6.

| Component | CE 1 | IE1 | IE2 | IE3 | IE4 | IE5 | IE6 |
|---|---|---|---|---|---|---|---|
| WB135HMS [wt %] | 100 | 90 | 85 | 80 | 90 | 85 | 80 |
| VPPP SSC [wt %] | 0 | 10 | 15 | 20 | 0 | 0 | 0 |
| VPPP ZNC [wt %] | 0 | 0 | 0 | 0 | 10 | 15 | 20 |
| MFR [g/10 min] | 2.4 | 8.0 | 8.7 | 12.5 | 7.4 | 10.6 | 11.3 |

As can be seen from Table 1 the melt flow rate of the high molecular weight polypropylene component (A) increases when the component is blended with a low molecular weight linear isotactic polypropylene component (B) having a high melt flow rate.

Furthermore, it could be demonstrated that the addition of low molecular weight material (component (B)) led to an MFR increase of 5 orders of magnitude while keeping a high melt strength and the same level of impact strength (cf. Table 2). The effect is more or less independent of the type of LMW-resin (i.e. based on SS-catalyst or ZN-catalyst).

TABLE 2

Thermal, mechanical and rheological characterization of examples

| Component | CE 1 | IE1 | IE2 | IE3 | IE4 | IE5 | IE6 |
|---|---|---|---|---|---|---|---|
| MFR [g/10 min] | 2.4 | 8.0 | 8.7 | 12.5 | 7.4 | 10.6 | 11.3 |
| Tm (DSC) [° C.] | 162 | 162 | 161 | 161 | 162 | 163 | 163 |
| Tc (DSC) [° C.] | 127 | 127 | 128 | 127 | 128 | 128 | 128 |
| Tens. mod. [MPa] | 2166 | 1876 | 1881 | 1873 | 1915 | 1923 | 1963 |
| Yield stress [MPa] | 43.3 | 39.8 | 39.8 | 39.6 | 40.5 | 40.5 | 41.1 |
| Charpy NIS +23° C. [kJ/m$^2$] | 4.5 | 4.8 | 4.7 | 4.4 | 4.9 | 4.6 | 4.0 |
| SHF (3/2.5) [—] | 6.5 | n.d. | 2.6 | n.d. | n.d. | 2.8 | n.d. |
| SHF (1/2) [—] | 3.6 | n.d. | 1.8 | n.d. | n.d. | 2.4 | n.d. |
| LAOS NLF [—] | 4.93 | n.d. | 4.06 | n.d. | n.d. | 3.96 | n.d. |
| F30 [cN] | 28.6 | n.d. | 15.2 | n.d. | n.d. | 13.2 | n.d. |

The invention claimed is:

1. A polypropylene composition comprising (A) 70 to 95 wt %, based on the total weight of the polypropylene composition, of a high molecular weight polypropylene component having a strain hardening factor in a range of 3.5 to 15 when measured at a strain rate of 3.0 s$^{-1}$ and a Hencky strain of 2.5, and (B) 5 wt % to 30 wt %, based on the total weight of the polypropylene composition, of a low molecular weight linear isotactic polypropylene component having a MFR$_2$ in a range of 500 to 5000 g/10 min measured according to ISO 1133 (230° C., 2.16 kg load).

2. The polypropylene composition according to claim 1 wherein the polypropylene composition has a MFR$_2$ of 5.0 to 30 g/10 min measured according to ISO 1133 (230° C., 2.16 kg load).

3. The polypropylene composition according to claim 1, wherein the high molecular weight polypropylene component (A) has an MFR$_2$ of 0.5 to 5.0 g/10 min measured according to ISO 1133 (230° C., 2.16 kg load).

4. The polypropylene composition according to claim 1, wherein the high molecular component (A) has a LAOS non-linearity factor (LAOS-NLF) in a range of 4.0 to 10.

5. The polypropylene composition according to claim 1, wherein the high molecular component (A) has a F30 melt strength as determined in the Rheotens test at 200° C. in a range of 6.0 to 30 cN.

6. The polypropylene composition according to claim 1, wherein the high molecular weight polypropylene component is a homopolymer component.

7. The polypropylene composition according to claim 1, wherein the polypropylene composition has a Charpy notched impact strength of 3.5 to 10 kJ/m$^2$ at 23° C. measured on an injection molded specimen according to ISO 179:2000 1eA.

8. The polypropylene composition according to claim 1, wherein the polypropylene composition has a tensile modulus in a range of 1600 to 4000 MPa measured on an injection molded specimen according to ISO 572-2.

9. The polypropylene composition according to claim 1, wherein the polypropylene composition has a crystallization temperature in a range of 120 to 145° C.

10. The polypropylene composition according to claim 1, wherein the polypropylene composition has a strain hardening factor (SHF) of 2.0 to 9.0 when measured at a strain rate of 3.0 s$^{-1}$ and a Hencky strain of 2.5.

11. The polypropylene composition according to claim 1, wherein the polypropylene composition has a LAOS non-linearity factor (LAOS-NLF) in a range of 2.5 to 8.0.

12. The polypropylene composition according to claim 1, wherein the polypropylene composition has F30 melt strength as determined in the Rheotens test at 200° C. in a range of 4.0 to 30 cN.

13. An article made of the polypropylene composition according to claim 1.

14. A method for producing a polypropylene composition according to claim 1 comprising mixing a low molecular weight linear isotactic polypropylene with a high molecular weight polypropylene, wherein the low molecular weight linear isotactic polypropylene has a MFR$_2$ in a range of 500 to 5000 g/10 min measured according to ISO 1133 (230° C., 2.16 kg load) and the high molecular weight polypropylene has a strain hardening factor in a range of 3.5 to 15 when measured at a strain rate of 3.0 s$^{-1}$ and a Hencky strain of 2.5;

and wherein the polypropylene composition comprises from 70 to 95 wt % of the high molecular weight polypropylene, and from 5 wt % to 30 wt % of the low molecular weight linear isotactic polypropylene, based on the total weight of the polypropylene composition.

* * * * *